(12) United States Patent
Ma et al.

(10) Patent No.: US 11,219,894 B2
(45) Date of Patent: Jan. 11, 2022

(54) MICROFLUIDIC CHANNEL STRUCTURE AND FABRICATION METHOD THEREOF, MICROFLUIDIC DETECTING DEVICE AND DETECTING METHOD THEREOF

(71) Applicant: BOE TECHNOLOGY GROUP CO., LTD., Beijing (CN)

(72) Inventors: Xiaochen Ma, Beijing (CN); Guangcai Yuan, Beijing (CN); Ce Ning, Beijing (CN); Xin Gu, Beijing (CN); Hehe Hu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 34 days.

(21) Appl. No.: 16/647,386

(22) PCT Filed: Sep. 24, 2019

(86) PCT No.: PCT/CN2019/107487
§ 371 (c)(1),
(2) Date: Mar. 13, 2020

(87) PCT Pub. No.: WO2020/093802
PCT Pub. Date: May 14, 2020

(65) Prior Publication Data
US 2021/0129140 A1     May 6, 2021

(30) Foreign Application Priority Data
Nov. 6, 2018    (CN) .......................... 201811312659.5

(51) Int. Cl.
*B01L 3/00*       (2006.01)
*B01L 9/00*       (2006.01)
(Continued)

(52) U.S. Cl.
CPC ......... *B01L 3/502707* (2013.01); *B01L 9/527* (2013.01); *G01N 21/05* (2013.01);
(Continued)

(58) Field of Classification Search
CPC ......... B01L 2200/10; B01L 2300/0645; B01L 2300/0887; B01L 2300/168;
(Continued)

(56) References Cited

U.S. PATENT DOCUMENTS 9,797,837 B2    10/2017  Kim et al.
2006/0101775 A1  5/2006  Miyake et al.
(Continued)

FOREIGN PATENT DOCUMENTS

CA    2930832 A1    5/2015
CN    1766645 A     5/2006
(Continued)

OTHER PUBLICATIONS

First Chinese Office Action Application No. 201811312659.5; dated Sep. 11, 2020.

*Primary Examiner* — Jennifer Wecker

(57)    ABSTRACT

A microfluidic channel structure and a fabrication method thereof, a microfluidic detecting device and a detecting method thereof are disclosed. The microfluidic channel structure includes a support portion; a foundation portion, provided on the support portion and including a first foundation and a second foundation spaced apart from each other; and a channel defining portion, provided on a side of the foundation portion that is away from the support portion and including a first channel layer and a second channel layer, the first channel layer covering the first foundation and the second channel layer covering the second foundation (Continued)

have a gap therebetween to define a microfluidic channel; and the first channel layer and the second channel layer are made of a same material.

19 Claims, 9 Drawing Sheets

(51) Int. Cl.
*G01N 21/05* (2006.01)
*G01N 21/63* (2006.01)

(52) U.S. Cl.
CPC .......... *G01N 21/63* (2013.01); *B01L 2200/10* (2013.01); *B01L 2300/168* (2013.01)

(58) Field of Classification Search
CPC ............... B01L 3/502707; B01L 9/527; G01N 2021/0346; G01N 2021/056; G01N 2021/6482; G01N 21/05; G01N 21/63; G01N 35/00
See application file for complete search history.

(56) References Cited

U.S. PATENT DOCUMENTS

| | | |
|---|---|---|
| 2006/0147350 A1 | 7/2006 | Sugita |
| 2008/0245971 A1 | 10/2008 | Wimberger-Friedl et al. |
| 2008/0311375 A1 | 12/2008 | Harnack et al. |
| 2014/0002816 A1 | 1/2014 | Liu et al. |
| 2015/0253321 A1 | 9/2015 | Chou et al. |
| 2018/0372634 A1* | 12/2018 | Krishnamoorthy .. G01N 21/554 |

FOREIGN PATENT DOCUMENTS

| | | |
|---|---|---|
| CN | 101175553 A | 5/2006 |
| CN | 101278186 A | 10/2008 |
| CN | 101301990 A | 11/2008 |
| CN | 102706835 A | 10/2012 |
| CN | 103008038 A | 4/2013 |
| CN | 104483496 A | 4/2015 |
| CN | 104620113 A | 5/2015 |
| CN | 104823049 A | 8/2015 |
| CN | 105917003 A | 8/2016 |
| CN | 108474741 A | 8/2018 |
| DE | 10130568 A1 | 1/2003 |
| DE | 10219560 C1 | 10/2003 |

* cited by examiner

MICROFLUIDIC CHANNEL STRUCTURE AND FABRICATION METHOD THEREOF, MICROFLUIDIC DETECTING DEVICE AND DETECTING METHOD THEREOF

CROSS-REFERENCE TO RELATED APPLICATIONS

The present application claims priority of Chinese Patent Application No. 201811312659.5 entitled "Microfluidic Channel Structure and Fabrication Method thereof, Microfluidic Detecting Device and Operation Method thereof" and filed on Nov. 6, 2018, for all purposes, the disclosure of which is incorporated herein by reference in its entirety as part of the present application.

TECHNICAL FIELD

Embodiments of the present disclosure relate to a microfluidic channel structure and a fabrication method thereof, a microfluidic detecting device and a detecting method thereof.

BACKGROUND

A microfluidic device is usually referred to as a Lab On a Chip (LOC) or a micro-Total Analysis System (microTAS), which is configured to perform biological or chemical reactions by operating a small amount of fluid, for detection and analysis of biological molecules, such as gene sequencing and single protein detection, etc. The microfluidic channel is a core component of a microfluidic device, but a fabrication technology thereof is still inefficient, complex, and expensive, and therefore, there is room for improvement.

SUMMARY

According to first aspect of the present disclosure, there is provided, microfluidic channel structure, comprising:
a support portion;
a foundation portion on the support portion, the foundation portion comprising a first foundation and a second foundation spaced apart from each other, the first foundation and the second foundation having an extension direction parallel to a surface of the support portion; and
a channel defining portion on a side of the foundation portion away from the support portion, the channel defining portion comprising a first channel layer and a second channel layer, the first channel layer covering the first foundation, the second channel layer covering the second foundation, a gap between the first channel layer and the second channel layer defining a microfluidic channel, and the first channel layer and the second channel layer being made of a same material.

According to second aspect of the present disclosure, there is provided a microfluidic detecting device, comprising the afore-mentioned microfluidic channel structure, wherein the microfluidic channel is provided therein with a sample to be detected, and the microfluidic detecting device further comprises:
at least one signal transmitter, configured to generate an excitation signal, the excitation signal irradiating the sample to be detected to excite the sample to be detected to generate a sample signal; and
at least one signal detector, configured to receive and detect the sample signal.

According to third aspect of the present disclosure, there is provided a detecting method of the afore-mentioned microfluidic detecting device, comprising:
generating, by the at least one signal transmitter, an excitation signal, to excite the sample to be detected in the microfluidic channel to generate a sample signal; and
receiving, by the at least one signal detector, the sample signal, to detect the sample to be detected,
wherein the excitation signal is at least partially reflected by the light reflective layer facing towards the microfluidic channel, so as to excite the sample to be detected, or the sample signal is at least partially reflected by the light reflective layer facing towards the microfluidic channel, so as to reach the at least one signal detector.

According to fourth aspect of the present disclosure, there is provided a method for fabricating a microfluidic channel structure, comprising:
preparing a support portion;
forming a foundation portion on the support portion, the foundation portion comprising a first foundation and a second foundation spaced apart from each other, the first foundation and the second foundation having an extension direction parallel to a surface of the support portion; and
forming a channel defining portion on a side of the foundation portion that is away from the support portion, the channel defining portion comprising a first channel layer and a second channel layer, the first channel layer covering the first foundation, the second channel layer covering the second foundation, a gap between the first channel layer and the second channel layer defines a microfluidic channel, and the first channel layer, the second channel layer, and the microfluidic channel are formed simultaneously in a same process.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1A:
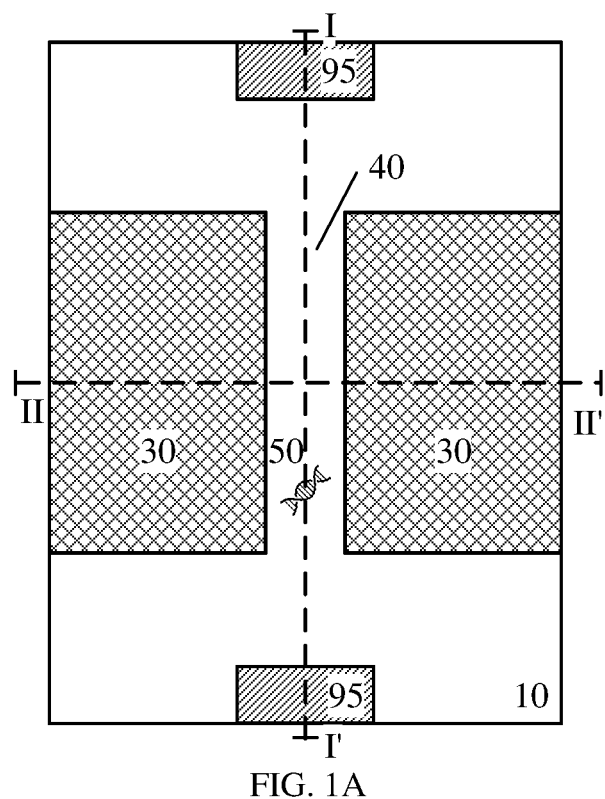
FIG. 1A and FIG. 1B are schematic diagrams of a microfluidic detecting device according to an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In order to reach magnitude of sub-micron accuracy, fabrication of a microfluidic channel usually requires special technologies such as an electron beam exposure technology and an interference photoetching technology. Moreover, steps of etching, stripping, and attaching a support portion etched with a groove to a top portion are very complex. In addition, the electron beam exposure apparatus is expensive and its fabrication process is slow, rendering it inapplicable to large-scale mass production, and greatly increasing difficulty and cost of fabrication. Although interference fringes with sub-micron accuracy may be formed by using the interference photoetching technology, special morphologies such as a turning spiral of the microfluidic channel cannot be implemented. The microfluidic channel is usually formed by etching a material of the support portion, then attaching and packaging, which greatly increases difficulty in integrating electrodes or devices near the microfluidic channel. In addition, how to effectively measure a sample to be detected in the microfluidic channel and how to improve measurement accuracy are also urgent problems in the art.

Embodiments of the present disclosure provide a microfluidic channel structure and a fabrication method thereof, a microfluidic detecting device and a detecting method thereof, which aim to overcome or alleviate one or more of the technical problems as described above. Hereinafter, specific implementation modes of the microfluidic channel structure and the fabrication method thereof, and the microfluidic detecting device provided by the embodiments of the present disclosure will be specifically described in conjunction with the accompanying drawings.

Figure 1B:
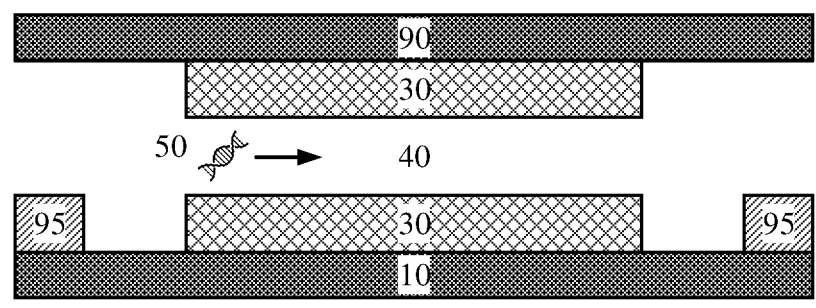

An embodiment of the present disclosure provides a microfluidic detecting device, FIG. 1A schematically illustrates a top view of the microfluidic detecting device, and FIG. 1B is a cross-sectional view taken along a line in FIG. 1A. As shown in the diagrams, the microfluidic detecting device comprises a support portion 10 and a channel defining portion 30 provided on the support portion 10. The channel defining portion 30 defines a microfluidic channel 40. For example, the microfluidic detecting device further comprises a driving electrode 95 provided on the support portion 10. In an operating state, a voltage is applied to the driving electrode 95, to drive a sample 50 to be detected to pass through the microfluidic channel 40. When the sample 50 to be detected passes through the microfluidic channel 40, an excitation signal transmitter of the microfluidic detecting device generates an excitation signal, to excite the sample 50 to be detected. The sample 50 to be detected is excited by the excitation signal to generate a sample signal. A detector of the microfluidic detecting device receives the sample signal, so as to further analyze and detect the sample 50 to be detected.

In an exemplary embodiment, the microfluidic detecting device further comprises a cover plate 90 provided opposite to the support portion 10 and used to package the microfluidic channel structure.

In the embodiment shown in FIG. 1A, the microfluidic channel 40 has an extension direction parallel to a surface of the support portion 10. For example, the microfluidic channel 40 has a substantially straight-line shape. According to the embodiment of the present disclosure, the microfluidic channel 40 may have other shape, for example, a curved-line shape, or a composite shape composed of a plurality of segments of straight lines and a plurality of turns.

Figure 2A:
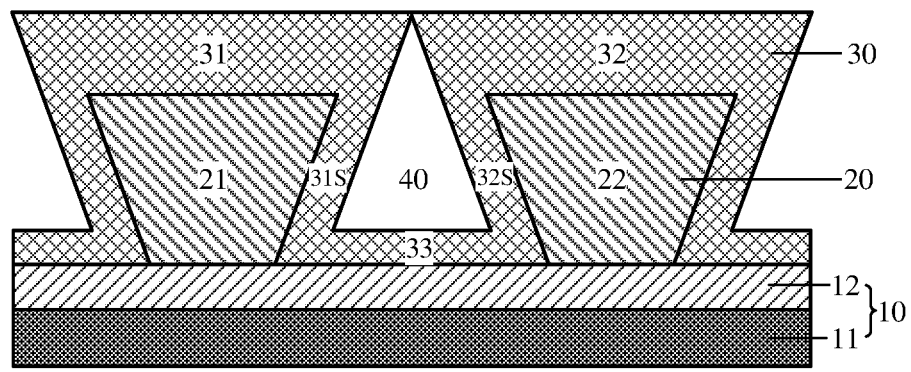
FIG. 2A is a schematic diagram of a microfluidic channel structure according to an embodiment of the present disclosure.

An embodiment of the present disclosure provides a microfluidic channel structure. FIG. 2A is a cross-sectional view taken along a line II-II' in FIG. 1A. As shown in the diagram, the microfluidic channel structure comprises a support portion 10, a foundation portion 20 and a channel defining portion 30. The foundation portion 20 is provided on the support portion 10 and includes a first foundation 21 and a second foundation 22 spaced apart from each other. The first foundation 21 and the second foundation 22 have an extension direction parallel to a surface of the support portion 10. The channel defining portion 30 is provided on a side of the foundation portion 20 that is away from the support portion 10, and includes a first channel layer 31 and a second channel layer 32. The first channel layer 31 covers the first foundation 21; the second channel layer 32 covers the second foundation 22; and the first channel layer 31 and the second channel layer 32 are partially spaced apart from each other to form a gap defining the microfluidic channel 40. The first channel layer 31 and the second channel layer 32 are made of a same material.

In this embodiment, in a plane perpendicular to the extension direction, the microfluidic channel 40 has a cross section tapered in a direction from the support portion 10 to the foundation portion 20. In the context of the present disclosure, the tapered cross section refers to a cross section gradually reduced in size. The size of the cross section may be reduced continuously or stepwise. For example, in the plane perpendicular to the extension direction, the first foundation 21 and the second foundation 22 have cross sections tapered in a direction from the foundation portion 20 to the support portion 10. That is, in the embodiment shown in FIG. 2A, the cross sections of the first foundation 21 and the second foundation 22 are continuously reduced in the direction from the foundation portion 20 to the support portion 10. In an exemplary embodiment, the cross sections of the first foundation 21 and the second foundation 22 have an inverted trapezoidal shape.

In an exemplary embodiment, the support portion 10 includes a base substrate 11 and an excitation signal transmitter 12 provided on a side of the base substrate 11 that faces towards the foundation portion 20.

Figure 2B:
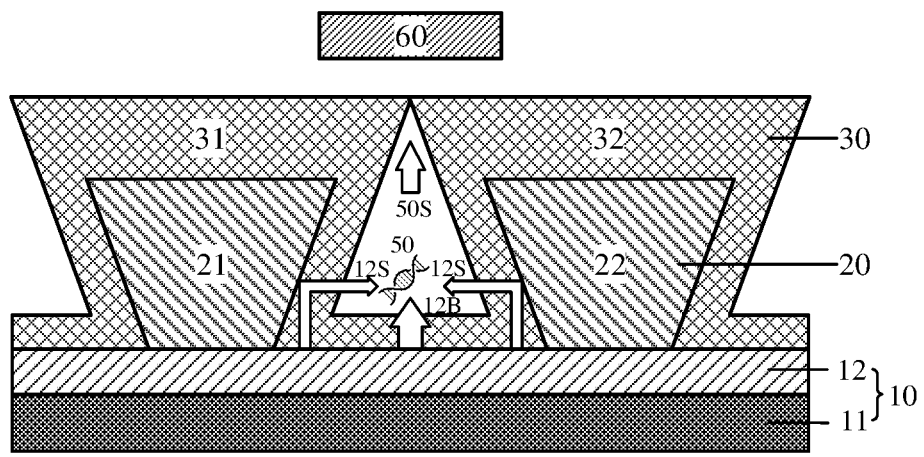
FIG. 2B is a schematic diagram of a microfluidic detecting device according to an embodiment of the present disclosure.

FIG. 2B schematically illustrates a microfluidic detecting device based on the microfluidic channel structure shown in FIG. 2A. In an exemplary embodiment, the microfluidic detecting device comprises the microfluidic channel structure shown in FIG. 2A and a detector 60, For example, the detector 60 is provided directly above the microfluidic channel 40 of the microfluidic channel structure, that is, a side of the microfluidic channel 40 that is away from the support portion 11.

The excitation signal transmitter 12 is configured to generate the excitation signal such as an optical signal to detect the sample 50 to be detected within the microfluidic channel 40. In an exemplary embodiment, excitation signal transmitters 12 are evenly spread over a surface of the base substrate 11. In an alternative embodiment, the excitation signal transmitter 12 is provided directly below the microfluidic channel 40 so that the excitation signal emitted thereby is efficiently used, to excite the sample 50 to be detected in the microfluidic channel 40.

As shown in FIG. 2B, an excitation signal 12B emitted by the excitation signal transmitter 12 and propagating upward from directly below the microfluidic channel 40 reaches the microfluidic channel 40, so as to excite the sample 50 to be detected in the microfluidic channel 40. In addition, the excitation signals emitted by the excitation signal transmitter 12 propagate upwardly, and are projected onto side faces of the first foundation 21 and the second foundation 22 in a region of the surface of the support portion 10 that does not overlap with an orthographic projection of the microfluidic channel 40, and then reflected by the side faces of the first foundation 21 and the second foundation 22. As shown in FIG. 2B, the reflected excitation signals 12S excite the sample 50 to be detected in the microfluidic channel 40.

That is to say, because the first foundation 21 and the second foundation 22 have cross sections tapered in the direction from the foundation portion 20 to the support portion 10, the side faces of the first foundation 21 and the second foundation 22 redirect the excitation signals emitted by the excitation signal transmitter 12 to the sample 50 to be detected. Thus, the excitation signals emitted by the excitation signal transmitter 12 can be used more efficiently to excite the sample 50 to be detected.

In addition, as compared with a case where only the excitation signal 12B is configured to excite the sample 50 to be detected, the excitation signals with greater strength are configured to excite the sample 50 to be detected, because the redirected excitation signals 12S are further configured to excite the sample 50 to be detected, and thus, the sample 50 to be detected correspondingly generates a sample signal 50S with greater strength, which increases the probability of detecting the sample 50 to be detected.

In an exemplary embodiment, the first foundation 21 and the second foundation 22 have reflective side faces, so as to facilitate redirecting the excitation signal.

In an exemplary embodiment, the channel defining portion 30 further includes a first channel wall 31S covering the side face of the first foundation 21 and a second channel wall 32S covering the side face of the second foundation 22, as shown in FIG. 2A. The first channel wall 31S and the second channel wall 32S are provided opposite to each other, and the two respectively serve as two opposite side walls of the microfluidic channel 40. For example, the first channel layer 31 and the second channel layer 32 are in contact with each other, so that a shape of the cross section of the microfluidic channel 40 in the plane perpendicular to the extension direction of the microfluidic channel 40 is an enclosed pattern, at this time, the microfluidic channel has an enclosed chamber. For example, the enclosed pattern is, for example, an isosceles triangle, or a triangle with two arched waists.

In an exemplary embodiment, the channel defining portion 30 further includes a third channel layer 33 connecting the first channel wall 31S and the second channel wall 32S, In this case, the first channel wall 31S, the second channel wall 32S and the third channel layer 33 define the microfluidic channel 40.

A material of the channel defining portion 30 is transparent with respect to the excitation signals 12B, 12S from the excitation signal transmitter 12, so as not to hinder the excitation signals from being transmitted through the first channel wall 31S, the second channel wall 32S and the third channel layer 33 to excite the sample 50 to be detected in the microfluidic channel 40. The material of the channel defining portion 30 is transparent with respect to the sample signal 50S corning from the sample 50 to be detected, so as not to hinder the sample signal from being transmitted through the first channel layer 31 and the second channel layer 32 to be received by the detector 60. For example, the first channel wall 31S, the second channel wall 32S and the third channel layer 33 are all made of a same light-transmitting material, so that the excitation signals can be transmitted through the above-described respective layers. For another example, the first channel layer and the second channel layer are also made of a light-transmitting material the same as the first material layer, which, thus, facilitates forming the microfluidic channel 40 while forming the first channel layer, the second channel layer and the third channel layer as described above.

Figure 2C:
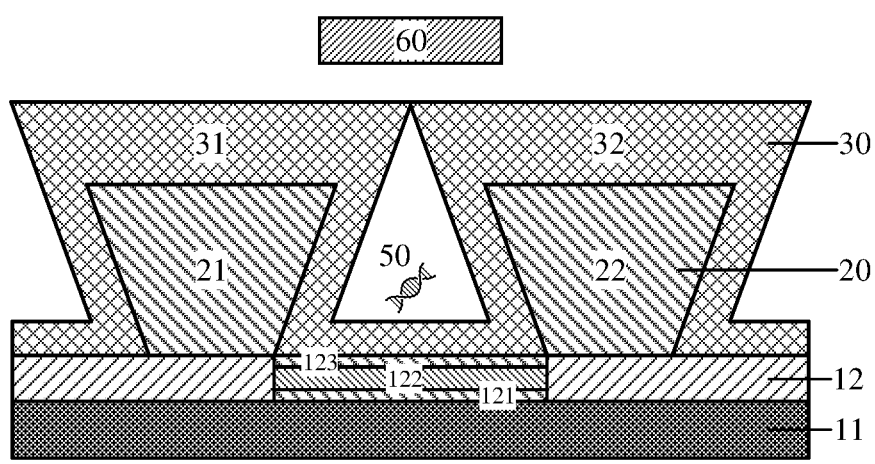
FIG. 2C is a schematic diagram of a microfluidic detecting device according to an embodiment of the present disclosure.

FIG. 2C schematically illustrates an implementation mode of the embodiment shown in FIG. 2B. As shown in FIG. 2C, the excitation signal transmitter 12 includes a first electrode 121, an active layer 122 and a second electrode 123, which are sequentially stacked. When a voltage is applied to the excitation signal transmitter 12 through the first electrode 121 and the second electrode 123, the active layer 122 generates the excitation signal to excite the sample 50 to be detected. In the embodiment shown in FIG. 2C, the lamination of the first electrode 121, the active layer 122 and the second electrode 123 is provided only in a region below the microfluidic channel 40. In other embodiments, each of the first electrode 121, the active layer 122 and the second electrode 123 may be formed on the whole surface of the base substrate 11.

Figure 2D:
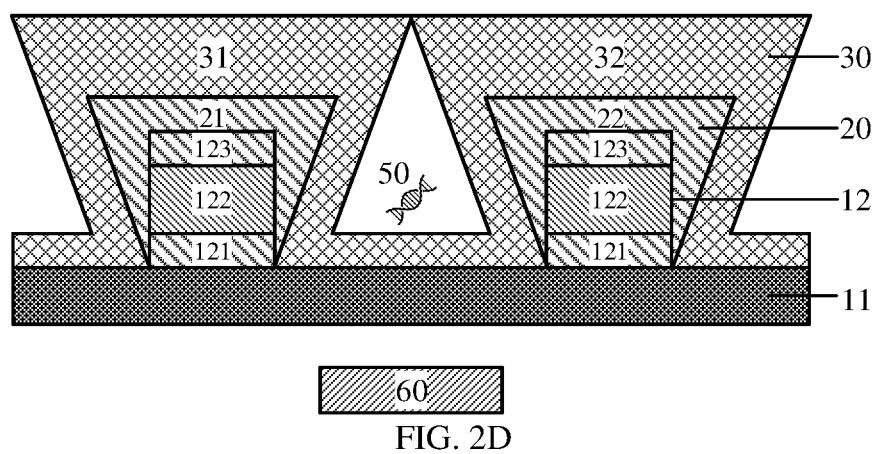
FIG. 2D is a schematic diagram of a microfluidic detecting device according to an embodiment of the present disclosure.

FIG. 2D schematically illustrates another implementation mode of the embodiment shown in FIG. 2B. As shown in FIG. 2D, the excitation signal transmitter 12 is provided in both the first foundation 21 and the second foundation 22, and includes the lamination of the first electrode 121, the active layer 122 and the second electrode 123. For example, the detector 60 is provided directly below the microfluidic channel 40 of the microfluidic channel structure.

In the microfluidic detecting devices shown in FIG. 2B to FIG. 2D, the detector 60 is schematically illustrated as being provided separately from the microfluidic channel structure. In other embodiments, the detector 60 may be formed above the microfluidic channel structure, i.e., integrated into the microfluidic channel structure. For example, the detector 60 is integrated on the support portion 10. For example, the detector 60 is provided in a region of the support portion 10 that is located below the microfluidic channel 40. Similar to the detector 60, the excitation signal transmitter 12 may also be provided separately from the microfluidic channel structure according to requirements of application scenarios.

Figure 3A:
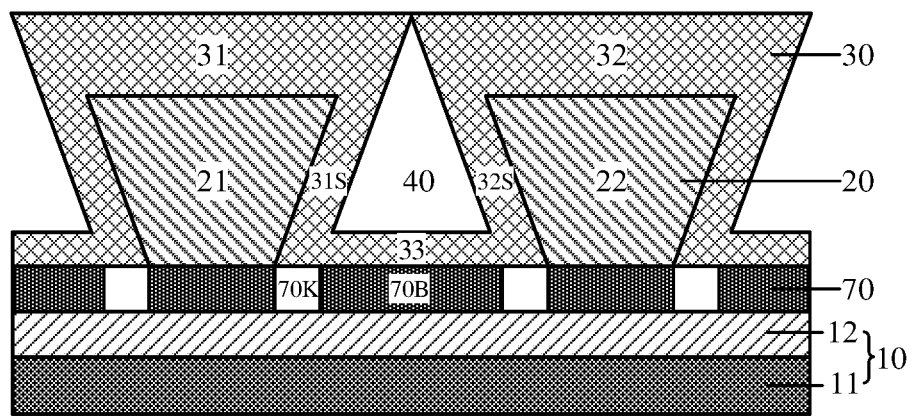
FIG. 3A is a schematic diagram of a microfluidic channel structure according to an embodiment of the present disclosure.

FIG. 3A schematically illustrates a variation of the microfluidic channel structure shown in FIG. 2A. As shown in FIG. 3A, the microfluidic channel structure further comprises an optical film layer 70 provided between the support portion 10 and the foundation portion 20. The optical film layer 70 includes an optical signal transmission region 70K and an optical signal shielding region 70B. An orthographic projection of the microfluidic channel 40 on the support portion 10 falls within an orthographic projection of the optical signal shielding region 70B on the support portion 10. The optical signal shielding region 70B is opaque with respect to the excitation signal coming from the excitation signal transmitter 12. An orthographic projection of the optical signal transmission region 70K on the support portion 10 falls within orthographic projections of the side faces of the first foundation 21 and the second foundation 22 on the support portion 10. The optical signal transmission region 70K is transparent with respect to the excitation signal from the excitation signal transmitter 12.

In an exemplary embodiment, the optical film layer 70 is made of a material that is opaque with respect to the excitation signal, and the optical signal transmission region 70K is a region in the optical film layer 70 where the material is absent. In this case, the optical signal transmission region 70K is an opening in the optical film layer 70. In other embodiment, the optical signal transmission region 70K is made of a material that is transparent with respect to the excitation signal.

Figure 3B:
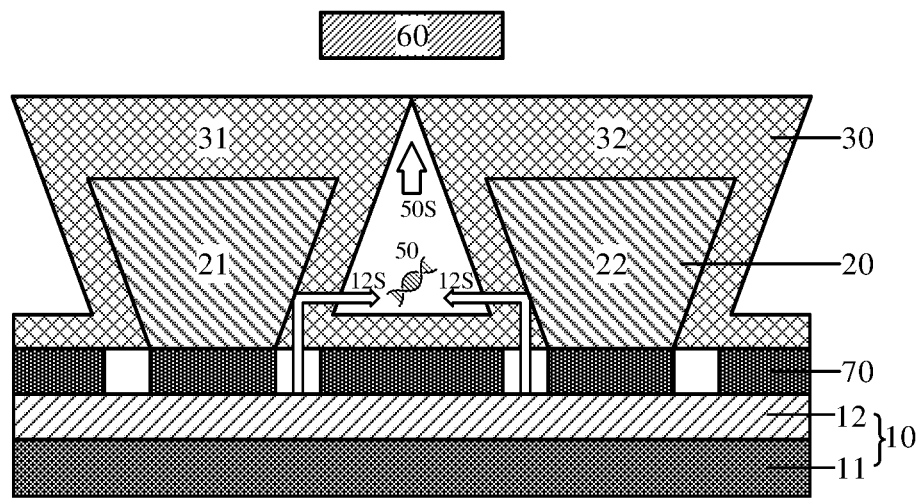
FIG. 3B is a schematic diagram of a microfluidic detecting device according to an embodiment of the present disclosure.

FIG. 3B schematically illustrates a microfluidic detecting device based on the microfluidic channel structure shown in FIG. 3A. In an exemplary embodiment, similar to the embodiment shown in FIG. 2B, the detector 60 is provided directly above the microfluidic channel 40 of the microfluidic channel structure.

As shown in FIG. 3B, the orthographic projection of the microfluidic channel 40 falls within the orthographic projection of the optical signal shielding region 70B. Because the optical signal shielding region 70B is opaque with respect to the excitation signal, the excitation signal emitted by the excitation signal transmitter 12 and propagating upwardly from directly below the microfluidic channel 40 (e.g., the excitation signal 12B in FIG. 2B) is blocked and cannot reach the microfluidic channel 40. Because the optical signal transmission region 70K is transparent with respect to the excitation signal, and the orthographic projections of the optical signal transmission region 70K falls within the orthographic projections of the side faces of the first foundation 21 and the second foundation 22, the excitation signals emitted by the excitation signal transmitter 12 are transmitted through the optical signal transmission region 70K, and are redirected to the sample 50 to be detected by the side faces of the first foundation 21 and the second foundation 22, for example, the excitation signals 12S as shown in FIG. 3B.

In the above-described embodiment, the optical signal shielding region 70B of the optical film layer 70 is configured to control a propagation path of the excitation signal. The excitation signal from the excitation signal transmitter 12 is blocked, so it cannot directly enter the detector 60 directly above the microfluidic channel structure. Therefore, interference to the detector 60 by the background excitation signal from the excitation signal transmitter 12 is shielded, which is favorable for increasing detection accuracy of the sample to be detected.

In the microfluidic detecting device shown in FIG. 2B and FIG. 3B, the arrows 12S are only to explain approximate propagation directions of the excitation signals after being redirected. In the presence of the first channel wall 31S and the second channel wall 32S, when the excitation signals are emergent from the first channel wall 31S and the second channel wall 32S to the microfluidic channel 40, the propagation directions are slightly deflected.

In conjunction with the embodiments shown in FIG. 2B and FIG. 3B, a detecting method of the microfluidic detecting device will be briefly described. As shown in FIG. 2B and FIG. 3B, the excitation signal transmitter 12 is provided in the support portion 10, and the detector 60 is provided on a side of the microfluidic channel 40 that is away from the support portion 10. In this case, the detecting method of the microfluidic detecting device comprises: generating, by the excitation signal transmitter 12, the excitation signal, herein, the excitation signal is at least partially reflected by the side faces of the first foundation 21 and the second foundation 22 that face towards the microfluidic channel 50, so as to excite the sample 50 to be detected in the microfluidic channel 40 to generate a sample signal 50S; and receiving, by the detector 60, the sample signal 50S, to detect the sample 50 to be detected.

It should be noted that, in the microfluidic detecting devices shown in FIG. 2B, FIG. 2C, FIG. 2D and FIG. 3B, positions of the excitation signal transmitter 12 and the detector 60 may be interchanged.

In a case where the positions of the excitation signal transmitter 12 and the detector 60 of FIG. 2B are interchanged, the sample 50 to be detected is excited by the excitation signal from the excitation signal transmitter 12 to generate the sample signal. The sample signal is partially incident on the side faces of the first foundation 21 and the second foundation 22, and is redirected to the detector 60 located below the foundation portion 20. In this way, the sample signal generated by the sample 50 to be detected is received by the detector 60 more efficiently, which increases the probability of detecting the sample 50 to be detected.

In the case where the positions of the excitation signal transmitter 12 and the detector 60 of FIG. 2B are interchanged, the excitation signal transmitter 12 is provided on the side of the microfluidic channel 40 that is away from the support portion 10, and the detector 60 is provided in the support portion 10. In this case, the detecting method of the microfluidic detecting device comprises: generating, by the excitation signal transmitter 12, the excitation signal, to excite the sample 50 to be detected in the microfluidic channel 40 to generate the sample signal 50S, herein, the sample signal 50S is at least partially reflected by the side faces of the first foundation 21 and the second foundation 22 that face towards the microfluidic channel 40; and receiving, by the detector 60, the sample signal, so as to detect the sample 50 to be detected.

In a case where the positions of the excitation signal transmitter 12 and the detector 60 in FIG. 3B are interchanged, the sample 50 to be detected is excited by the excitation signal from the excitation signal transmitter 12 to generate the sample signal. The sample signal is partially incident on the side faces of the first foundation 21 and the second foundation 22, and is redirected and transmitted through the optical signal transmission region 70K, and then received by the detector 60 located below the foundation portion 20. The excitation signal from the excitation signal transmitter 12 is blocked by the optical signal shielding region 70B, so as not to directly enter the detector 60 provided directly below the microfluidic channel structure. In this way, the interference to the detector 60 by the background excitation signal from the excitation signal transmitter 12 is shielded, which is favorable for increasing detection accuracy of the sample to be detected.

In the above-described embodiment, the excitation signal transmitter 12 or the detector 60 is provided in the support portion 10. This is equivalent to that the excitation signal transmitter or the detector is integrated into the microfluidic channel structure, which, as compared with a traditional attaching process, facilitates accurately integrating a signal transmitter or a signal receiver near the microfluidic channel, and aligning the same with the microfluidic channel, so to as meet measurement accuracy requirements of gene sequencing, protein detection, or the like.

Hereinafter, a variation of the microfluidic channel structure of FIG. 2A will be described in conjunction with FIG. 4A to FIG. 4D. In FIG. 4B to FIG. 4D, the channel defining portion 30 is not shown for the sake of simplicity.

Figure 4A:
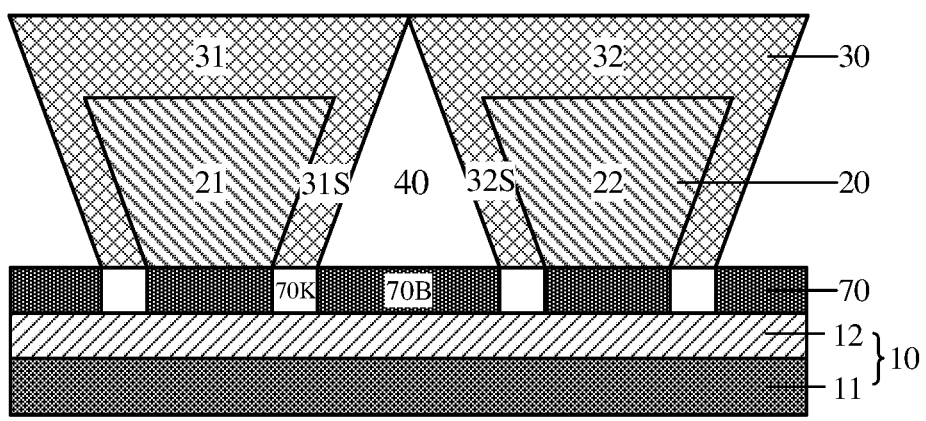
FIG. 4A, FIG. 4B, FIG. 4C and FIG. 4D are schematic diagrams of a microfluidic channel structure according to embodiments of the present disclosure.
Figure 4B:
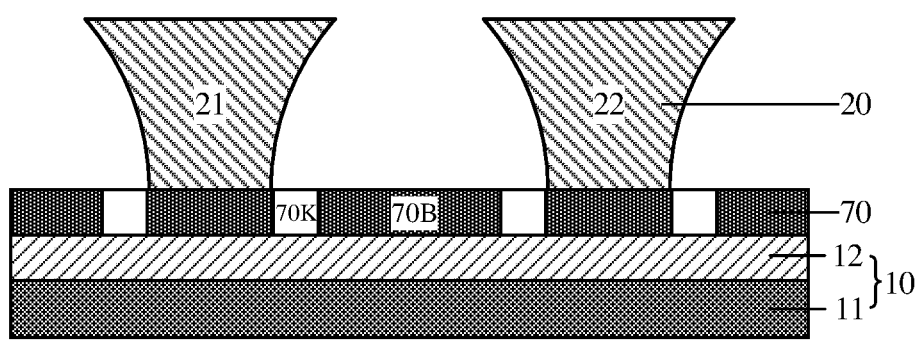
Figure 4C:
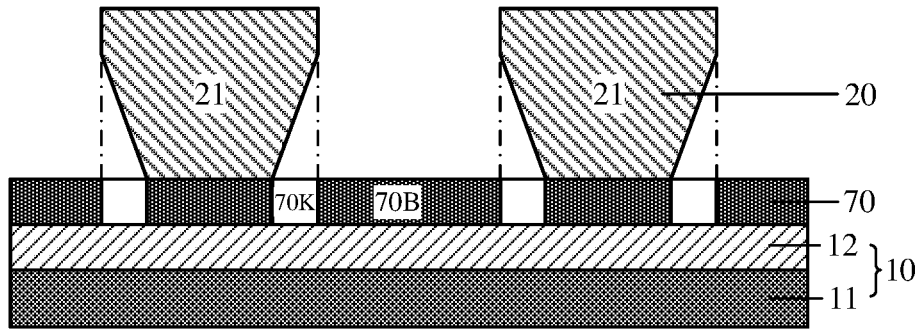
Figure 4D:
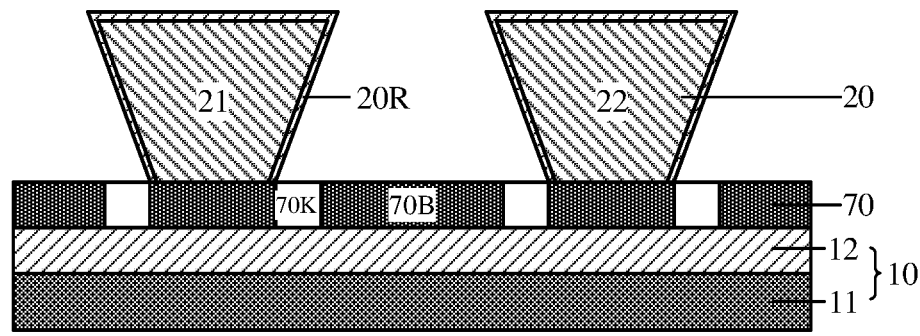

As shown in FIG. 4A, in some embodiments, the channel defining portion 30 of the microfluidic channel structure does not include the third channel layer 33. In this case, the optical film layer 70 constitutes a bottom portion of the microfluidic channel 40. That is, the first channel wall 31S, the second channel wall 32S, and the optical film layer 70 define the microfluidic channel 40.

In some embodiments, the channel defining portion 30 of the microfluidic channel structure does not include the first channel wall 31S, the second channel wall 32S and the third channel layer 33. In this case, (the side face of) the first foundation 21, (the side face of) the second foundation 22, and the optical film layer 70 define the microfluidic channel 40.

In some embodiments, the channel defining portion 30 does not include the first channel wall 31S, the second channel wall 32S and the third channel layer 33; and the microfluidic channel structure does not include die optical film layer 70. That is, the microfluidic channel 40 is directly adjacent to the support portion 10. In this case, (the side face of) the first foundation 21, (the side face of) the second foundation 22, and the support portion 10 define the microfluidic channel 40.

As shown in FIG. 4B, in some embodiments, in the plane perpendicular to the extension direction of the first foundation 21 or the second foundation 22, both sides of each of the cross sections of the first foundation 21 and the second foundation 22 are arc-shaped. That is, the side faces of the first foundation 21 and the second foundation 22 are arc-shaped in a cross section. Similar to the propagation path of the excitation signal shown in FIG. 2B and FIG. 3B, such side faces are also favorable for redirecting the excitation signal. Therefore, the first foundation 21 and the second foundation 22 having such a configuration can also efficiently utilize the excitation signal from the excitation signal transmitter, and increase the probability of detecting the sample to be detected.

In the embodiment shown in FIG. 2A, FIG. 3A and FIG. 4A, the cross sections of the first foundation and the second foundation are shaped as inverted trapezoids. In the embodiment shown in FIG. 4B, the cross sections of the first foundation and the second foundation are shaped as heteromorphic inverted trapezoids having arc-shaped waists. The embodiment of the present disclosure is not limited thereto. In other embodiments, both sides of each of the cross sections of the first foundation and the second foundation have a complicated profile constituted by a straight line and a circular arc, etc. In principle, a first foundation and a second foundation having any cross section tapered in the direction from the foundation portion to the support portion can redirect the excitation signal from the excitation signal transmitter to the sample to be detected.

In an exemplary embodiment, each of cross sections of the first foundation and the second foundation has a portion tapered in the direction from the foundation portion to the support portion. The tapered portion of the cross section facilitates redirecting the excitation signal from the excitation signal transmitter to the sample to be detected. For example, in the embodiment shown in FIG. 4C, both sides of each of the cross sections of the first foundation 21 and the second foundation 22 are composed of vertical straight lines at top portion and inclined straight lines at bottom portion. A portion of the cross section where the inclined straight line is located is tapered in the direction from the foundation portion 20 to the support portion 10. In a case where the microfluidic channel structure includes the optical film layer 70, the orthographic projection of the optical signal transmission region 70K on the support portion 10 falls in orthographic projections of the tapered portions of the cross sections of the first foundation 21 and the second foundation 22 on the support portion 10, as shown by dashed lines in FIG. 4C.

In the embodiment shown in FIG. 4D, the foundation portion 20 further includes a reflective layer 20R, provided on the side faces of the first foundation 21 and the second foundation 22 that face towards the microfluidic channel 40. In an exemplary embodiment, the reflective layer 20R is formed of a metal material. The metal reflective layer forms a specular reflective layer, which is favorable for redirecting the excitation signal from the excitation signal transmitter to the sample to be detected. The reflective layer 20R is further arranged, for example, on top faces of the first foundation 21 and the second foundation 22 that are away from the support portion 10.

Figure 6B:
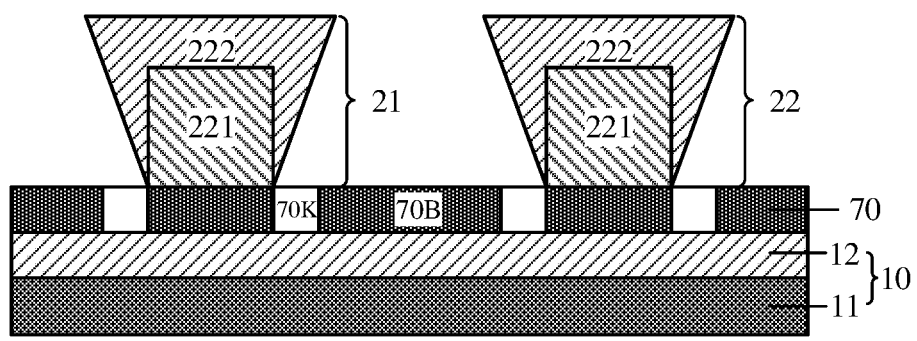
Figure 7:
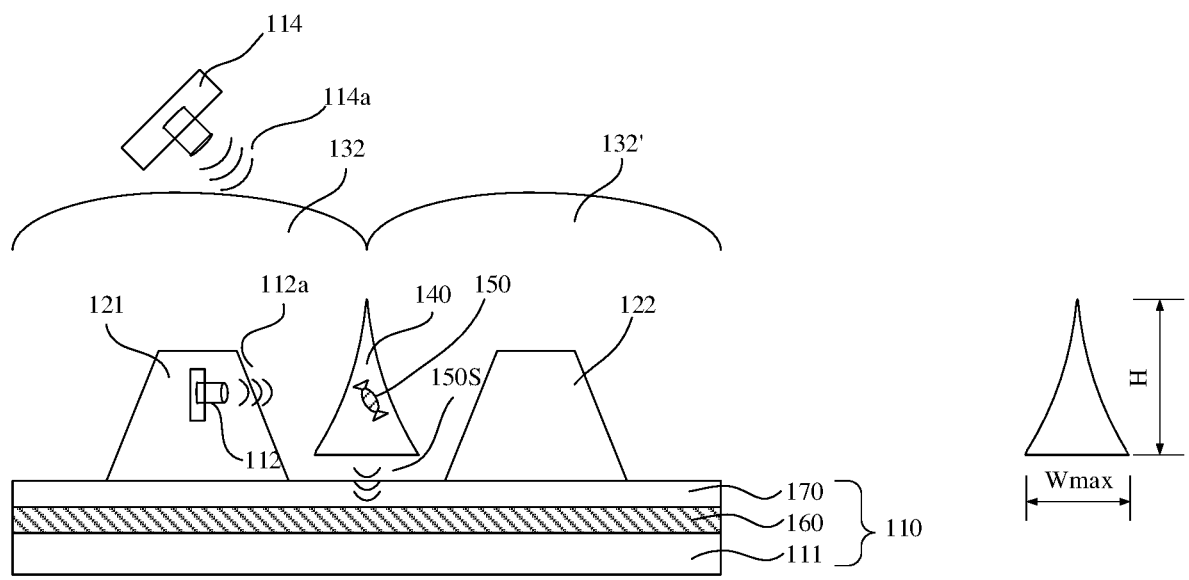
FIG. 7 is a schematic diagram of a microfluidic detecting device according to an embodiment of the present disclosure.

For example, in the embodiment shown in FIG. 7, in a plane perpendicular to an extension direction of a microfluidic channel 140, a ratio of a maximum width Wmax to a height H of a cross section of the microfluidic channel 140 is in a range of 1:10 to 10:1. Within the numerical range, the microfluidic channel 140 may be formed while forming a first channel layer 132 and a second channel layer 132' by sputtering. For example, in a plane perpendicular to an extension direction of a first foundation 121 and a second foundation 122, the first foundation 121 and the second foundation 122 have cross sections of a same shape, and the shape of the cross sections is a positive trapezoid, as shown in FIG. 7. It may be understood that, the shape of the above-described cross sections may also be an inverted trapezoid (FIG. 2A), a rectangle (FIG. 6B), or a cross-sectional pattern with two arc-shaped side edges (FIG. 4B).

In at least some embodiments, a signal transmitter includes a first signal transmitter provided in the foundation portion; and a signal detector is provided in at least one of positions below: on a side of the channel defining portion that is away from the support portion, on a side of the support portion that is away from the channel defining portion, and in the support portion. For example, as shown in FIG. 7, the first signal transmitter 112 is provided in the first foundation 121, and is configured to generate a first excitation signal 112a that is configured to irradiate the sample 150 to be detected in the microfluidic channel 140. The signal detector 160 is provided in the support portion 110, and is configured to receive a sample signal 150S generated by the sample 150 to be detected. For example, the support portion 110 includes a base substrate 111, as well as a signal detector 160 and a protective layer 170 located on the base substrate 111. The protective layer 170 is configured to be transparent and configured to block water and oxygen.

Optionally, a second signal transmitter 114 is further provided on the side of the channel defining portion that is away from the support portion 110, and is configured to generate a second excitation signal 114a that is configured to irradiate the sample 150 to be detected of the microfluidic channel 140. The signal detector 160 is further configured to receive the sample signal generated by the sample 150 to be detected as excited by the second excitation signal 114a. In this embodiment, the channel defining portion is composed of the first channel layer 132 and the second channel layer 132'; and the first channel layer 132 and the second channel layer 132' respectively package the first foundation 121 and the second foundation 122. Configurations of the first channel layer 132 and the second channel layer 132' may be applied to the embodiment shown in any one of the previous diagrams.

Figure 8:
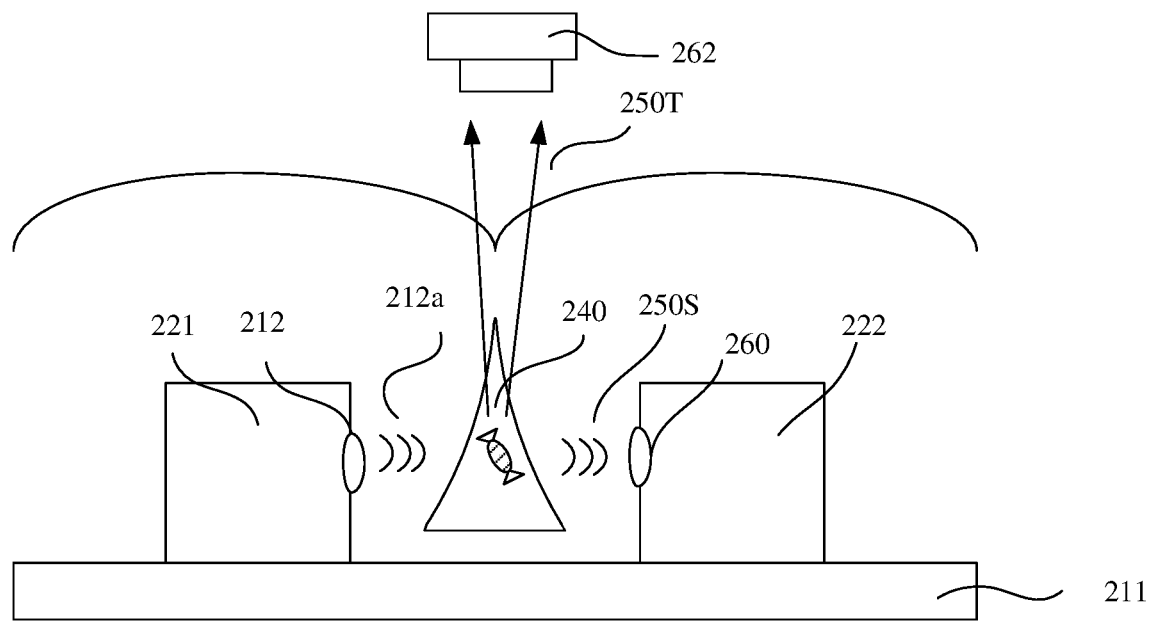
FIG. 8 is a schematic diagram of a microfluidic detecting device according to an embodiment of the present disclosure.

In at least some embodiments, one of the signal transmitter and the signal detector is provided in the first foundation of the foundation portion, and the other is provided in the second foundation of the foundation portion. For example, as shown in FIG. 8, a signal transmitter 212 is provided in a first foundation 221, and is configured to generate an excitation signal 212a. A first signal detector 260 is provided in a second foundation 222, and is configured to receive a sample signal 250S generated by a sample to be detected. When the excitation signal 212a is a laser signal, the sample signal 250S generated by the sample to be detected will propagate along a propagation direction of the excitation signal 212a, so that the first signal detector 260 located in the second foundation 222 can receive the sample signal 250S. For example, the signal transmitter 212 may be used as the first foundation 221. The first signal detector 260 may be used as the second foundation 222, which can simplify a fabrication process of the foundation portion. For example, the signal transmitter 212 and the first signal detector 260 may be formed directly on a base substrate 211.

Optionally, a second signal detector 262 is further provided on a side of a microfluidic channel 240 that is away from a support portion 310. When the excitation signal 212a is ordinary fluorescent light, the sample to be detected will be excited to generate an absorption spectrum signal 250T, and the absorption spectrum signal may be received by the second signal detector 262.

Hereinafter, a fabrication method of a microfluidic channel structure according to an embodiment of the present disclosure will be described. According to the embodiment of the present disclosure, the method for fabricating the microfluidic channel structure comprises: preparing a support portion; forming a foundation portion, the foundation portion including a first foundation and a second foundation spaced apart from each other, herein, the first foundation and the second foundation have an extension direction parallel to a surface of the support portion, and in a plane perpendicular to the extension direction, the first foundation and the second foundation have cross sections tapered in the direction from the foundation portion to the support portion; and forming a channel defining portion, the channel defining portion including a first channel layer and a second channel layer, herein, the first channel layer covers the first foundation, the second channel layer covers the second foundation, and the first channel layer and the second channel layer are partially spaced apart from each other to define a microfluidic channel.

Specifically, by taking the microfluidic channel structure shown in FIG. 3A as an example, a fabrication method of a microfluidic channel structure according to an embodiment of the present disclosure will be described in conjunction with FIG. 5A to FIG. 5H.

Figure 5A:
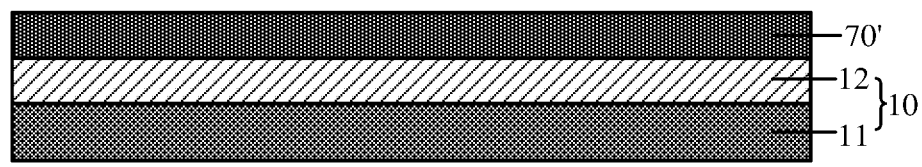
FIG. 5A, FIG. 5B, FIG. 5C, FIG. 5D, FIG. 5E, FIG. 5F, FIG. 5G and FIG. 5H are schematic diagrams of a fabrication process of a microfluidic channel structure according to embodiments of the present disclosure.

As shown in FIG. 5A, a support portion 10 is prepared. For example, the step of preparing a support portion 10 includes: preparing a base substrate 11, and forming an excitation signal transmitter 12 on the base substrate 11. In an exemplary embodiment, excitation signal transmitters 12 are evenly spread over a surface of the base substrate 11. In an alternative embodiment, the excitation signal transmitter 12 is provided directly below a microfluidic channel to be formed. An optical signal shielding layer 70' is formed on the base substrate 11 on which the excitation signal transmitter 12 is formed. The optical signal shielding layer 70' is made of a material that is opaque with respect to an excitation signal from the excitation signal transmitter 12.

Figure 5B:
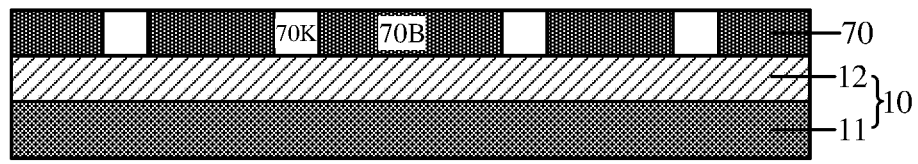

As shown in FIG. 5B, an optical film layer 70 is formed. Specifically, the optical signal shielding layer 70' is subjected to a patterning process such that a selected portion of the optical signal shielding layer 70' is removed to form an optical signal transmission region 70K, In an exemplary embodiment, the selected portion of the optical signal shielding layer 70' is backfilled with a material that is transparent with respect to the excitation signal, to form the optical signal transmission region 70K, Through the above-described steps, the optical film layer 70 including the optical signal transmission region 70K and the optical signal shielding region 70B that are alternately arranged is formed. An orthographic projection of the microfluidic channel to be formed on the support portion 10 falls within an orthographic projection of the optical signal shielding region 70B on the support portion 10.

Figure 5C:
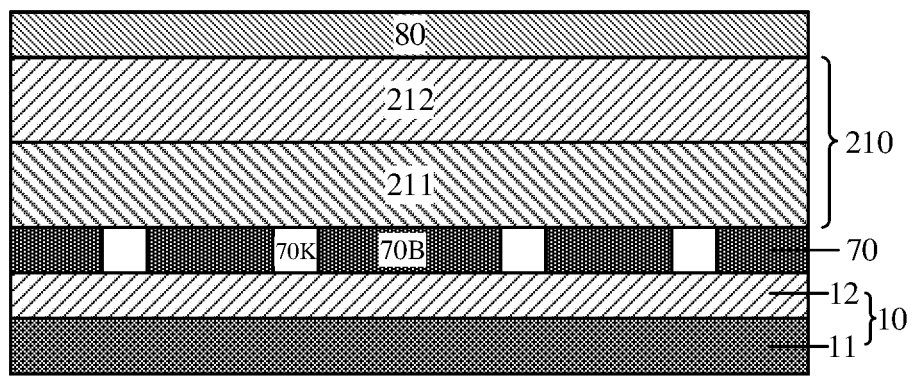

As shown in FIG. 5C, two or more foundation material layers are sequentially deposited on the optical film layer 70 to form a foundation laminated layer 210, and an imprint adhesive layer 80 is coated on the foundation laminated layer 210. In this embodiment, two foundation material layers are taken as an example. Specifically, on the optical film layer 70, a first foundation material layer 211 and a second foundation material layer 212 are sequentially deposited to form the foundation laminated layer 210. An etching rate of the first foundation material layer 211 closer to the support portion 10 is higher than an etching rate of the second foundation material layer 212 farther away from the support portion 10.

In an exemplary embodiment, the first foundation material layer 211 and the second foundation material layer 212 are made of a same material, for example, silicon oxide. A deposition rate of the first foundation material layer 211 is greater than a deposition rate of the second foundation material layer 212, so that the etching rate of the first foundation material layer 211 is higher than the etching rate of the second foundation material layer 212.

In another exemplary embodiment, the first foundation material layer 211 and the second foundation material layer 212 are made of different materials. For example, the first foundation material layer 211 is made of silicon nitride that is relatively easy to etch, while the second foundation material layer 212 is made of silicon oxide that is relatively hard to etch, which makes the etching rate of the first foundation material layer 211 higher than the etching rate of the second foundation material layer 212.

It should be noted that, the material and the fabrication method of the first foundation material layer 211 and the second foundation material layer 212 will not be particularly limited in the embodiment of the present disclosure, and any material and formation method that can make the etching rate of the first foundation material layer 211 higher than the etching rate of the second foundation material layer 212 falls within the protection scope of the present disclosure.

Figure 5D:
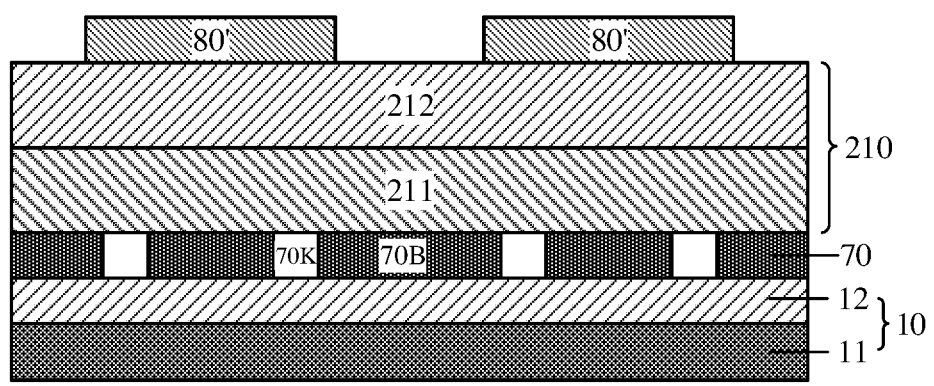

As shown in FIG. 5D, the imprint adhesive layer 80 is patterned to form patterned imprint adhesive 80'. For example, the patterning step includes: imprinting the imprint adhesive layer 80; curing the imprint adhesive layer 80 by ultraviolet radiation; and removing residual imprint adhesive that is probably present in an imprinted region of the imprint adhesive layer 80 by dry etching.

Figure 5E:
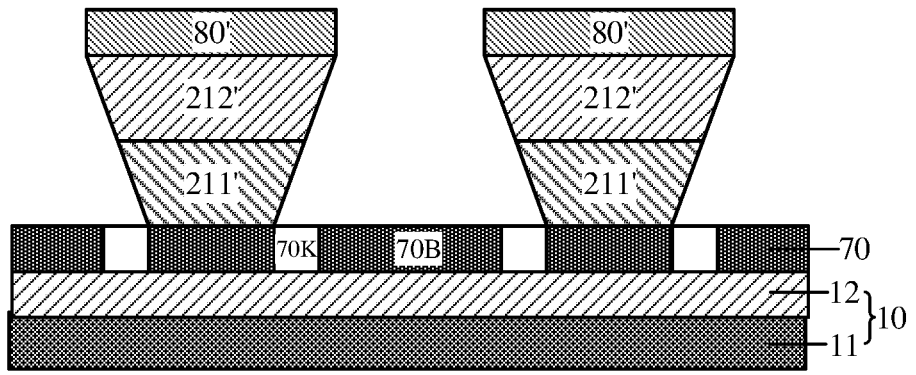
Figure 5F:
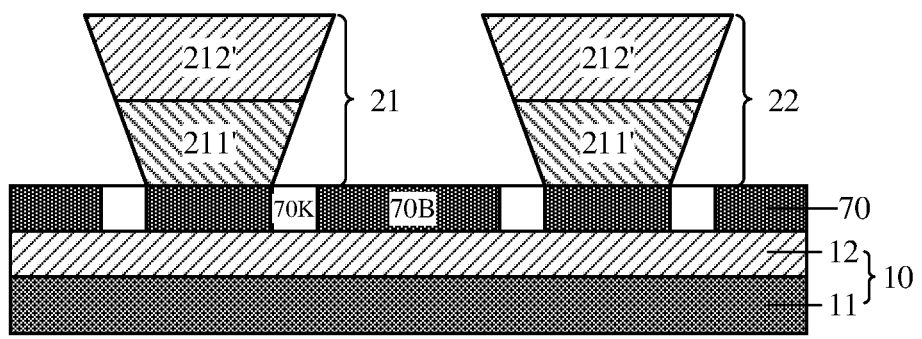

As shown in FIG. 5E to FIG. 5F, with the patterned imprint adhesive 80' as a mask, the foundation laminated layer 210 is etched to form a first foundation 21 and a second foundation 22. Since the etching rate of the first foundation material layer 211 is higher than the etching rate of the second foundation material layer 212, the first foundation 21 and the second foundation 22 obtained after the etching have cross sections tapered in a direction from a foundation portion 20 to the support portion 10. As shown in FIG. 5F, the patterned imprint adhesive 80' is stripped off.

Through the steps of FIG. 5C to FIG. 5F, the foundation portion 20 including the first foundation 21 and the second foundation 22 is formed. In an exemplary embodiment, a separation distance between the first foundation 21 and the second foundation 22 is from 5 nm to 5 μm, and a height of each of the first foundation 21 and the second foundation 22 is from 5 μm to 5 μm.

Figure 5G:
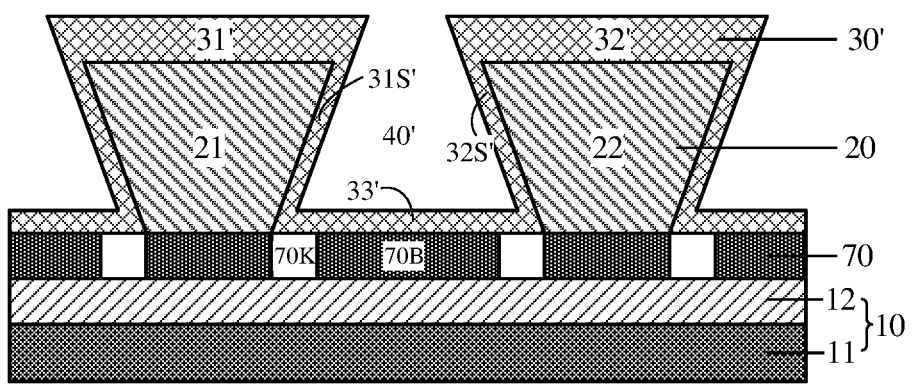
Figure 5H:
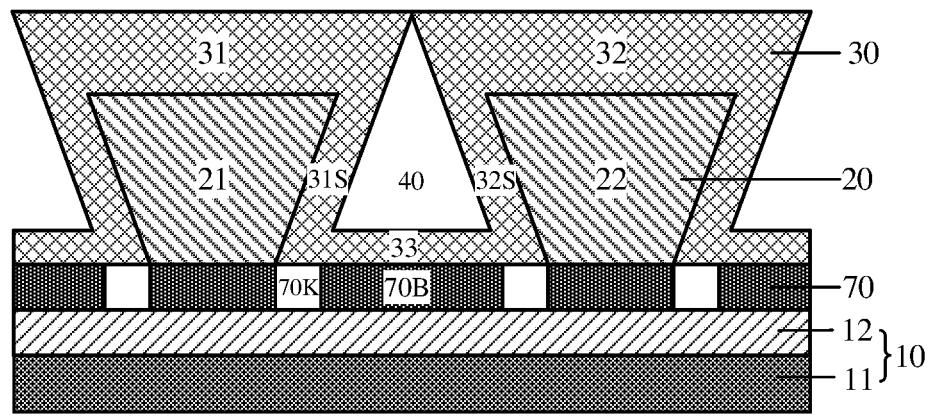

As shown in FIG. 5G to FIG. 5H, channel defining portions 30', 30 are formed on the foundation portion 20 by using a thin film deposition process.

Various suitable thin film deposition methods and suitable deposition apparatuses may all be used for depositing the channel defining portion, Examples of suitable deposition methods include: sputtering (e.g., magnetron sputtering) and evaporation (e.g., a chemical vapor deposition method, a plasma enhanced chemical vapor deposition (PECVD) method, a thermal vapor deposition method, an atomic layer deposition (ALD) method, and an electron beam evaporation method).

Taking the sputtering process as an example, a method for forming the channel defining portion is described. The structure shown in FIG. 5F is placed in a chamber of a sputtering apparatus. The sputtering apparatus may be a direct-current (DC) sputtering instrument, a DC pulse sputtering instrument, an radio frequency (RF) sputtering instrument, an intermediate frequency sputtering instrument, or the like. The sputtering process may be physical sputtering or reactive sputtering; and a target material used for sputtering is a material or a reactant of a formed micro-nano structure.

Specifically, the above-described structure is placed in a sample tray in the sputtering chamber. The sample tray is required to have good thermal conductivity. Sputtering is controlled at a relatively low temperature, for example, sputtering at a room temperature. During the sputtering process, a heat dissipation system may be configured to cool the sample tray, and a temperature of the sample tray during the sputtering process is, for example, controlled below 100° C.

The sputtering chamber of the sputtering instrument is evacuated to a high vacuum state. Subsequently, sputtering ionized gases, such as argon gas and nitrogen gas, flow into the sputtering chamber, With respect to reactive sputtering, reactive gas such as oxygen gas needs to be passed in. After the reactive gas is passed in, a working pressure inside the sputtering chamber is kept stable. A partial pressure of the reactive gas is controlled to ensure that reactive sputtering is completely performed.

A power supply is turned on to start the sputtering process, and a sputtering power is adjusted according to the sputtering apparatus and a type of the target. Power density of the sputtering target is a lowest sputtering power at which the apparatus is stably started and begins to have material deposited. In an exemplary embodiment, a size of an experimental substrate is 1,500 mm×1,800 mm; the sputtering temperature is the room temperature; and the sputtering type is reactive sputtering in which a silicon target is exposed to oxygen gas and argon gas. The sputtering apparatus is an intermediate frequency sputtering apparatus, with a power of about 5 kW and an air pressure of about 0.2 pa. Sputtered silicon oxide packages and covers the first foundation 21 and the second foundation 22 to form the channel defining portion 30'.

As shown in FIG. 5G, the channel defining portion 30' formed by sputtering includes a first channel layer 31' covering a top face of the first foundation 21, a second channel layer 32' covering a top face of the second foundation 22, a first channel wall 31S' covering a side face of the first foundation 21, a second channel wall 32S' covering a side face of the second foundation 22, and a third channel layer 33' covering an exposed portion of a surface of the optical film layer 70. In this embodiment, the first channel wall 31S', the second channel wall 32S', and the third channel layer 33' define the open microfluidic channel 40', In other words, in a case where the first channel layer 31' and the second channel layer 32' are not in contact with each other, a gap located between the first channel layer 31' and the second channel layer 32' forms the open microfluidic channel 40'; and in a plane perpendicular to the microfluidic channel 40', a shape of a cross section of the microfluidic channel 40' is a non-enclosed pattern, at this time, the microfluidic channel 40' has an opening on a side away from the support portion 10.

As shown in FIG. 5H, by controlling process parameters or time of sputtering, the enclosed microfluidic channel 40 as shown in FIG. 3A is formed. In this embodiment, the microfluidic channel 40 is defined by a first channel wall 31S, a second channel wall 32S and a third channel layer 33.

In a process of forming the channel defining portion, thin film deposition rates in different regions are uneven. A thin film deposition rate on the top faces of the first foundation 21 and the second foundation 22 is greater than a thin film deposition rate on the side faces thereof. In addition, in a region of the side faces of the first foundation 21 and the second foundation 22 that is closer to the support portion 10, the thin film deposition rate is smaller. Therefore, in the thin film deposition process, before the microfluidic channel 40' is filled up, the first channel wall 31S' and the second channel wall 32S' are close to each other, thereby forming the enclosed microfluidic channel 40 as shown in FIG. 5H.

Figure 6A:
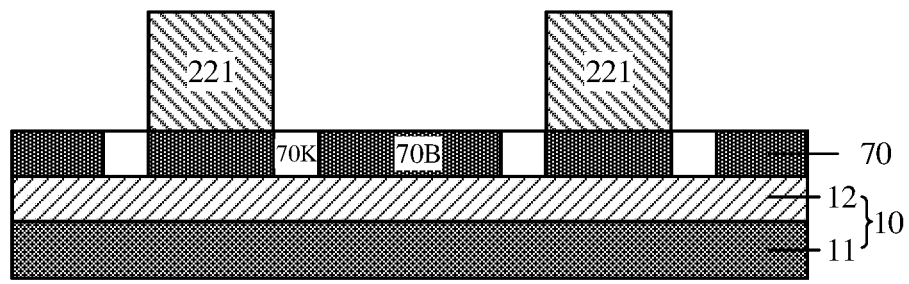
FIG. 6A and FIG. 6B are schematic diagrams of a fabrication process of a microfluidic channel structure according to an embodiment of the present disclosure.

A fabrication method of a foundation portion in a microfluidic channel structure according to an embodiment of the present disclosure is described in conjunction with FIG. 6A and FIG. 6B.

As shown in FIG. 6A, first sub-foundations 221 spaced apart from each other are formed on the support portion 10 shown in FIG. 5B.

As shown in FIG. 6B, second sub-foundations 222 covering top faces and side faces of the first sub-foundations 221 are formed by thin film lateral deposition, thereby forming a foundation portion 20 including a first foundation 21 and a second foundation 22.

Subsequently, through the steps described in conjunction with FIG. 5G and FIG. 5H, the channel defining portions 30', 30 are formed on the foundation portion 20.

The microfluidic detecting device according to the embodiment of the present disclosure may be various suitable detecting devices, for example, gas detecting devices, deoxyribonucleic acid (DNA) detecting devices, ribonucleic acid (RNA) detecting devices, peptide or protein detecting devices, antibody detecting devices, antigen detecting devices, tissue factor detecting devices, carrier and virus vector detecting devices, lipid and fatty acid detecting devices, steroid detecting devices, neurotransmitter detecting devices, inorganic ion and electrochemical detecting devices, pH detecting devices, free radical detecting devices, carbohydrate detecting devices, nerve detecting devices, chemical detecting devices, small molecule detecting devices, exon detecting devices, metabolite detecting devices, intermediate detecting devices, chromosome detecting devices and cell detecting devices.

In an exemplary embodiment, the excitation signal transmitter 12 may be a light-emitting diode (LED) or a laser diode (LD), etc., that emits an optical signal in a specific wavelength range. Under an action of the excitation signal emitted by the excitation signal transmitter 12, the sample 50 to be detected in the microfluidic channel 40 is excited to emit a fluorescent signal, and is further detected by the detector 60. In this way, the microfluidic detecting device according to the embodiment of the present disclosure may be used for protein detection, gene sequencing, or the like.

In the disclosure, the following should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness and a size of a layer or area may be enlarged or narrowed, that is, the drawings are not drawn in a real scale.

(3) In case of no conflict, features in one embodiment or in different embodiments can be combined as a new embodiment.

What is described above is related to the illustrative embodiments of the disclosure only and not limitative to the scope of the disclosure; the scopes of the disclosure are defined by the accompanying claims.

The invention claimed is:

1. A microfluidic channel structure, comprising:
   a support portion;
   a foundation portion on the support portion, the foundation portion comprising a first foundation and a second foundation spaced apart from each other, the first foundation and the second foundation having an extension direction parallel to a surface of the support portion;
   a channel defining portion on a side of the foundation portion away from the support portion, the channel defining portion comprising a first channel layer and a second channel layer, the first channel layer covering the first foundation, the second channel layer covering the second foundation, a gap between the first channel layer and the second channel layer defining a microfluidic channel, and the first channel layer and the second channel layer being made of a same material; and
   an optical film layer between the support portion and the foundation portion, wherein the optical film layer comprises an optical signal transmission region and an optical signal shielding region, and wherein an orthographic projection of the optical signal transmission region on the support portion falls within orthographic projections of side faces of the first foundation and the second foundation on the support portion, so that an excitation signal passes through the optical signal transmission region and reaches the microfluidic channel.

2. The microfluidic channel structure according to claim 1, wherein the channel defining portion further comprises:
   a first channel wall, covering a side face of the first foundation that faces towards the microfluidic channel;
   a second channel wall, covering a side face of the second foundation that faces towards the microfluidic channel;
   the first channel wall and the second channel wall are opposite to each other and serve as two opposite side walls of the microfluidic channel.

3. The microfluidic channel structure according to claim 2, wherein the channel defining portion further comprises: a third channel layer connecting the first channel wall and the second channel wall, wherein the third channel layer covers the support portion and serves as a bottom portion of the microfluidic channel.

4. The microfluidic channel structure according to claim 3, wherein the first channel layer, the second channel layer, the first channel wall, the second channel wall and the third channel layer are connected with one another and are made of a same light-transmitting material.

5. The microfluidic channel structure according to claim 1, wherein the first channel layer and the second channel layer are in contact with each other, so that the microfluidic channel has an enclosed chamber.

6. The microfluidic channel structure according to claim 1, wherein the first channel layer and the second channel layer are not in contact with each other, so that the microfluidic channel has an opening on a side that is away from the support portion.

7. The microfluidic channel structure according to claim 1, wherein the foundation portion further comprises a light reflective layer on side faces of the first foundation and the second foundation that face towards the microfluidic channel, wherein the light reflective layer is configured to reflect the excitation signal onto a sample to be detected.

8. The microfluidic channel structure according to claim 1, wherein each of the first foundation and the second foundation is formed by sequentially stacking two or more foundation layers.

9. The microfluidic channel structure according to claim 1, wherein an orthographic projection of the microfluidic channel on the support portion falls within an orthographic projection of the optical signal shielding region on the support portion.

10. The microfluidic channel structure according to claim 1, wherein the microfluidic channel has an extension direction parallel to the surface of the support portion, and the extension direction of the microfluidic channel is parallel to the extension direction of the first foundation and the second foundation; in a plane perpendicular to the extension direction of the microfluidic channel, the microfluidic channel has a cross section that is tapered in a direction from the support portion to the foundation portion.

11. A microfluidic detecting device, comprising:
a microfluidic channel structure, the microfluidic channel structure, comprising:
a support portion;
a foundation portion on the support portion, the foundation portion comprising a first foundation and a second foundation spaced apart from each other, the first foundation and the second foundation having an extension direction parallel to a surface of the support portion;
a channel defining portion on a side of the foundation portion away from the support portion, the channel defining portion comprising a first channel layer and a second channel layer, the first channel layer covering the first foundation, the second channel layer covering the second foundation, a gap between the first channel layer and the second channel layer defining a microfluidic channel, and the first channel layer and the second channel layer being made of a same material; and
an optical film layer between the support portion and the foundation portion, wherein the optical film layer comprises an optical signal transmission region and an optical signal shielding region, and wherein an orthographic projection of the optical signal transmission region on the support portion falls within orthographic projections of side faces of the first foundation and the second foundation on the support portion, so that an excitation signal passes through the optical signal transmission region and reaches the microfluidic channel,
wherein the microfluidic channel is provided therein with a sample to be detected, and the microfluidic detecting device further comprises:
at least one signal transmitter, configured to generate the excitation signal, the excitation signal irradiating the sample to be detected to excite the sample to be detected to generate a sample signal; and
at least one signal detector, configured to receive and detect the sample signal.

12. The microfluidic detecting device according to claim 11, wherein the at least one signal transmitter comprises a first signal transmitter in the foundation portion; the at least one signal detector is provided on a side of the channel defining portion that is away from the support portion, on a side of the support portion that is away from the channel defining portion, or in the support portion.

13. The microfluidic detecting device according to claim 12, wherein the at least one signal transmitter further comprises a second signal transmitter on the side of the channel defining portion that is away from the support portion.

14. The microfluidic detecting device according to claim 11, wherein one of the at least one signal transmitter and the at least one signal detector is in the first foundation of the foundation portion, and the other is provided in the second foundation of the foundation portion.

15. The microfluidic detecting device according to claim 14, wherein the at least one signal transmitter comprises a first signal transmitter configured to serve as the first foundation; the at least one signal detector comprises a first signal detector and a second signal detector; the first signal detector is configured to serve as the second foundation; and the second signal detector is located on a side of the microfluidic channel that is away from the support portion.

16. The microfluidic detecting device according to claim 11, wherein the foundation portion of the microfluidic channel structure further comprises a light reflective layer, wherein the light reflective layer is on a side face of each of the first foundation and the second foundation that faces towards the microfluidic channel.

17. A detecting method of the microfluidic detecting device according to claim 16, comprising:
generating, by the at least one signal transmitter, the excitation signal, to excite the sample to be detected in the microfluidic channel to generate the sample signal; and
receiving, by the at least one signal detector, the sample signal, to detect the sample to be detected,
wherein the excitation signal is at least partially reflected by the light reflective layer facing towards the microfluidic channel, so as to excite the sample to be detected, or the sample signal is at least partially reflected by the light reflective layer facing towards the microfluidic channel, so as to reach the at least one signal detector.

18. A method for fabricating a microfluidic channel structure, comprising:
preparing a support portion;
forming a foundation portion on the support portion, the foundation portion comprising a first foundation and a second foundation spaced apart from each other, the first foundation and the second foundation having an extension direction parallel to a surface of the support portion;
forming a channel defining portion on a side of the foundation portion that is away from the support portion, the channel defining portion comprising a first channel layer and a second channel layer, the first channel layer covering the first foundation, the second channel layer covering the second foundation, a gap between the first channel layer and the second channel layer defines a microfluidic channel, and the first channel layer, the second channel layer, and the microfluidic channel are formed simultaneously in a same process; and
forming an optical film layer between the support portion and the foundation portion, wherein the optical film layer comprises an optical signal transmission region and an optical signal shielding region, and wherein an orthographic projection of the optical signal transmission region on the support portion falls within orthographic projections of side faces of the first foundation and the second foundation on the support portion, so that the excitation signal passes through the optical signal transmission region and reaches the microfluidic channel.

19. The method according to claim 18, wherein the forming a foundation portion on the support portion comprises:
depositing two or more foundation material layers to form a foundation laminated layer, an etching rate being higher at a position of the foundation material layer that is closer to the support portion; and etching the foundation laminated layer with a mask to form the first foundation and the second foundation.

* * * * *